R. C. RHODES & W. F. HOLDEN.
HORSE-POWERS.
No. 186,878. Patented Jan. 30, 1877.
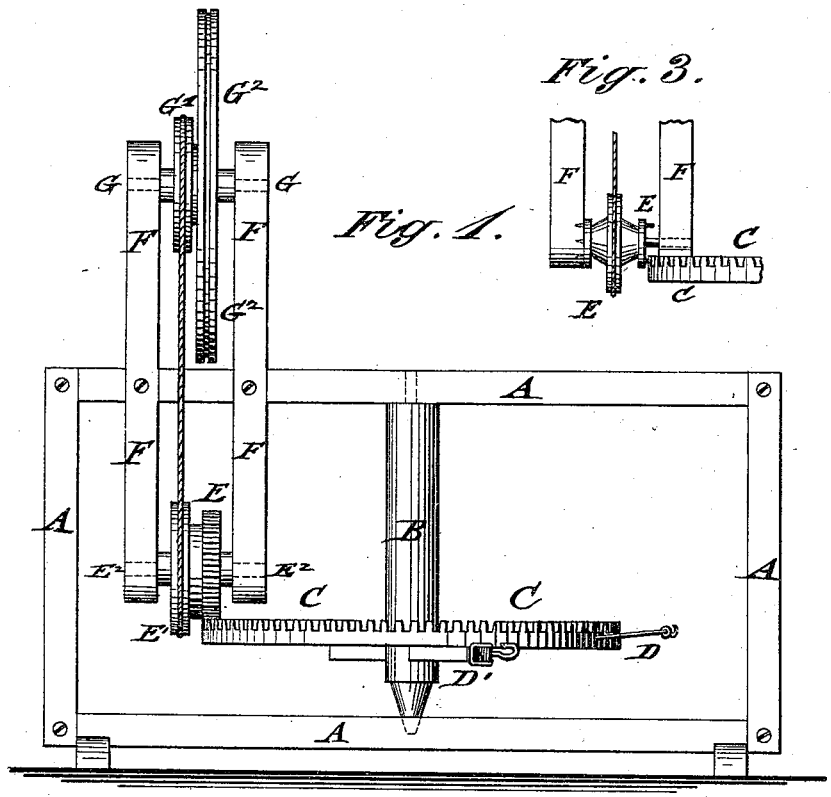
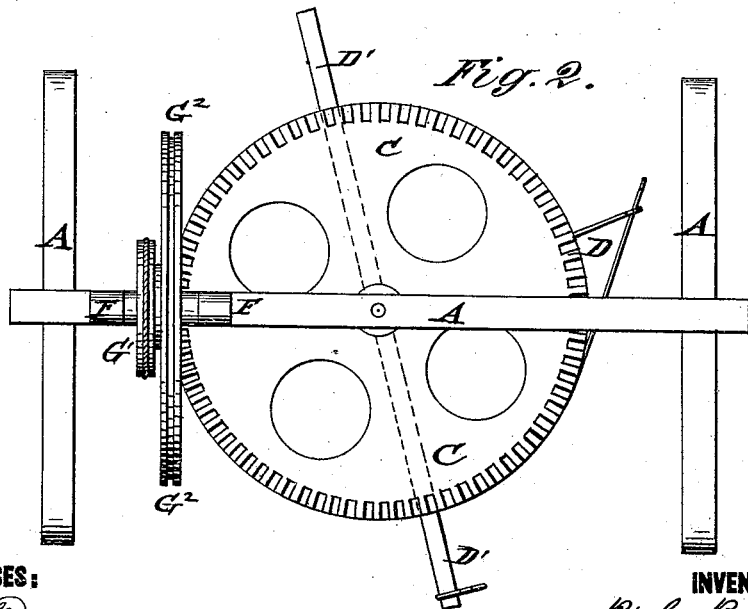
WITNESSES:
H. Rydquist
J. H. Scarborough
INVENTORS
R. C. Rhodes
W. F. Holden
BY
ATTORNEYS.

UNITED STATES PATENT OFFICE.

RADFORD C. RHODES AND WILLIAM F. HOLDEN, OF CRAWFORDSVILLE, GEORGIA.

IMPROVEMENT IN HORSE-POWERS.

Specification forming part of Letters Patent No. 186,878, dated January 30, 1877; application filed January 6, 1877.

*To all whom it may concern:*

Be it known that we, RADFORD C. RHODES and WILLIAM F. HOLDEN, of Crawfordsville, in the county of Taliaferro and State of Georgia, have invented a new and Improved Horse-Power, of which the following is a specification:

In the accompanying drawing, Figure 1 represents a front elevation, and Fig. 2 a top view, of our improved horse-power.

Similar letters of reference indicate corresponding parts.

The invention relates to an improved horse-power for cotton-gins, of simple construction and effective operation, that may be run with a less number of horses, and readily put up and taken down, transmitting the power in reliable and economical manner.

The invention consists of a vertical supporting frame, placed on the main frame of the king-post, and extended above and below the same, for supporting a band-wheel and fly-wheel on a shaft above, and a band-wheel and pinion on a common shaft below the top piece of the main frame, to transmit the power of the horizontal cog-wheel.

In the drawing, A represents the main frame of our horse-power, that supports the king-post B of the horizontal cog-wheel C, to which the horse or horses are attached, either by tangential levers and braces D, or by a diametrical lever, D', passing through king-post, and forming extensions of the arms of the cog-wheel C. The lever D' is placed loosely into a recess of king-post, to exert no pressure thereon, and is attached near the circumference of the cog-wheel. The vertical or crown-shaped teeth of the cog-wheel C intermesh with a pinion, E, that is keyed or attached to a band wheel or pulley, $E^1$, and revolved jointly with the shaft $E^2$, turning in bearings at the lower ends of a vertical frame, F, that is secured rigidly to the top piece of frame A, leaving sufficient space for the horses to pass between the same and the side posts of main frame A. The upright frame F is extended in upward direction above frame A, and arranged to carry a second shaft, G, at the upper end, on which the connected band-wheel $G^1$ and a weighted or loaded fly-wheel, $G^2$, are applied to be jointly revolved by the belt or rope connection with the lower band-wheel. The upper band-wheel and fly-wheel have one common shaft, like the lower band-wheel and pinion, so as to revolve jointly with the lower band-wheel and pinion in the top and bottom bearings of frame F.

The fly-wheel is loaded near the circumference to increase the momentum of the same for the transmission of the power by a band or belt to the gin.

The simple construction of the supporting-frame of the power-transmitting wheels and the reduced friction of the same, together with the effective action of the fly-wheel, render it possible to work the horse-power with less horses in economical manner, and admit the quicker putting up and taking down of the mechanism.

In place of the pinion gearing with the cog-wheel, a trundle-head with revolving rounds, as shown in Fig. 3, may be arranged. The cogs may be lined with sheet metal, and the rounds provided with anti-friction rollers to reduce the friction, and facilitate the running of the power. The shaft on which the trundle-head turns is attached to the upright frame at one end by pins or rounds, and supported in a socket-hole at the other end. The band-wheel is run by the friction with the trundle-head, or may be attached thereto, as desired.

Having thus described our invention, we claim as new and desire to secure by Letters Patent—

1. The combination, in a horse-power, of main frame A, supporting king-post, and main drive-wheel, with an upright frame, F, extending above and below the main frame, and carrying connected pinion and band-wheel at the lower end, and the jointly-revolving band-wheel and fly-wheel at the upper end, substantially in the manner and for the purpose set forth.

2. In a horse-power for cotton-gins, the combination of main cog-wheel C with pinion E and band-wheel E¹, attached to each other, and revolving in bearings at lower end of upright frame F, and with a transmitting-belt, band-wheel, and weighted fly-wheel at the upper end of frame F, the band and fly wheels being also keyed to each other, to revolve jointly with the lower wheels, substantially in the manner and for the purpose set forth.

RADFORD C. RHODES.
WILLIAM F. HOLDEN.

Witnesses:
NOEL M. DARDEN,
THOMAS C. HOLDEN.